United States Patent

Krauter et al.

Patent Number: 6,147,705
Date of Patent: **\*Nov. 14, 2000**

[54] APPARATUS AND METHOD FOR VIDEO COLPOSCOPE WITH ELECTRONIC GREEN FILTER

[75] Inventors: Allan I. Krauter, Syracuse; Jon R. Salvati, Skaneateles, both of N.Y.

[73] Assignee: Welch Allyn Inc., Skaneateles Falls, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/700,299

[22] Filed: Aug. 20, 1996

[51] Int. Cl.$^7$ .............................. H04N 9/73; A62B 1/04
[52] U.S. Cl. ............................................. 348/224; 348/65
[58] Field of Search .................. 348/45, 65, 70, 348/224, 225, 228, 256, 220

[56] References Cited

U.S. PATENT DOCUMENTS

| | | | |
|---|---|---|---|
| 4,739,392 | 4/1988 | Ueda et al. | 348/225 |
| 4,742,388 | 5/1988 | Cooper et al. | 348/65 |
| 4,851,900 | 7/1989 | Edwards et al. | 348/33 |
| 4,979,498 | 12/1990 | Oneda et al. | 600/118 |
| 5,014,329 | 5/1991 | Rudak | 382/17 |
| 5,016,173 | 5/1991 | Kenet et al. | 382/128 |
| 5,111,281 | 5/1992 | Sekiguchi | 348/65 |
| 5,365,267 | 11/1994 | Edwards | 348/65 |
| 5,485,203 | 1/1996 | Nakamura et al. | 348/70 |
| 5,512,947 | 4/1996 | Sawache et al. | 348/229 |
| 5,570,129 | 10/1996 | Hafele et al. | 348/225 |
| 5,627,583 | 5/1997 | Nakamura et al. | 348/65 |
| 5,867,284 | 2/1999 | Heinrichs et al. | 348/65 |
| 5,894,322 | 4/1999 | Hamano et al. | 348/65 |
| 5,910,816 | 6/1999 | Fontenot et al. | 348/65 |

*Primary Examiner*—Wendy Garber
*Assistant Examiner*—Alicia M. Harrington
*Attorney, Agent, or Firm*—Wall Marjama & Billinski

[57] ABSTRACT

A video colposcope includes a system microcomputer having algorithms for color balance levels stored into memory. A video camera obtains a subject electronic image of a subject object, and using algorithm-driven digital signal processing circuitry (DSP), color saturation, hue, and intensity levels of the subject electronic image are modified according to DSP reference filter algorithm and reference color balance levels as stored, thus producing a modified electronic image corresponding to the subject electronic image. The modified electronic image is outputted to a display in continuous real time as the corresponding subject image is obtained by the video camera. This modified electronic image emulates that obtained through an optical green filter and incorporates a simulated white balance.

8 Claims, 5 Drawing Sheets

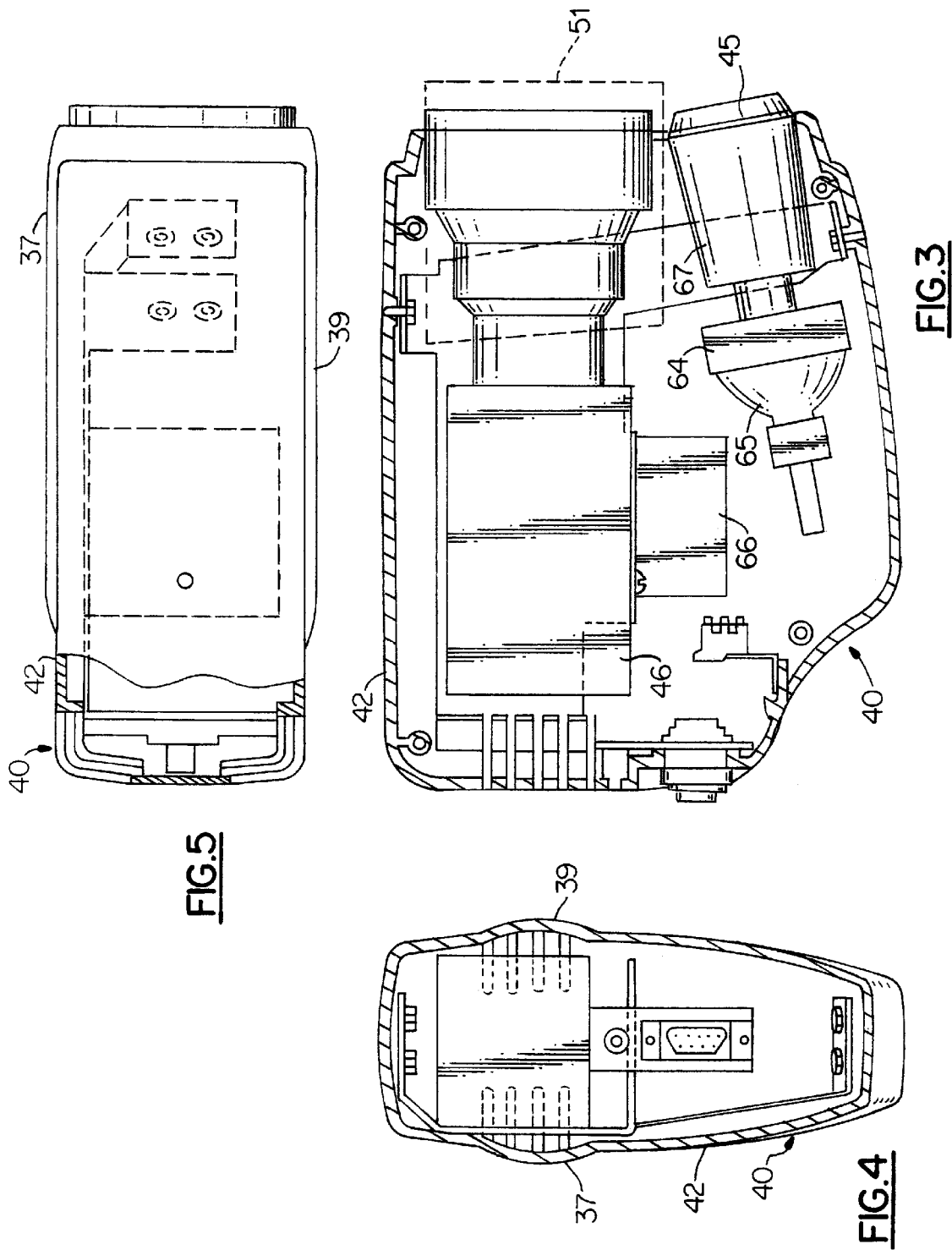

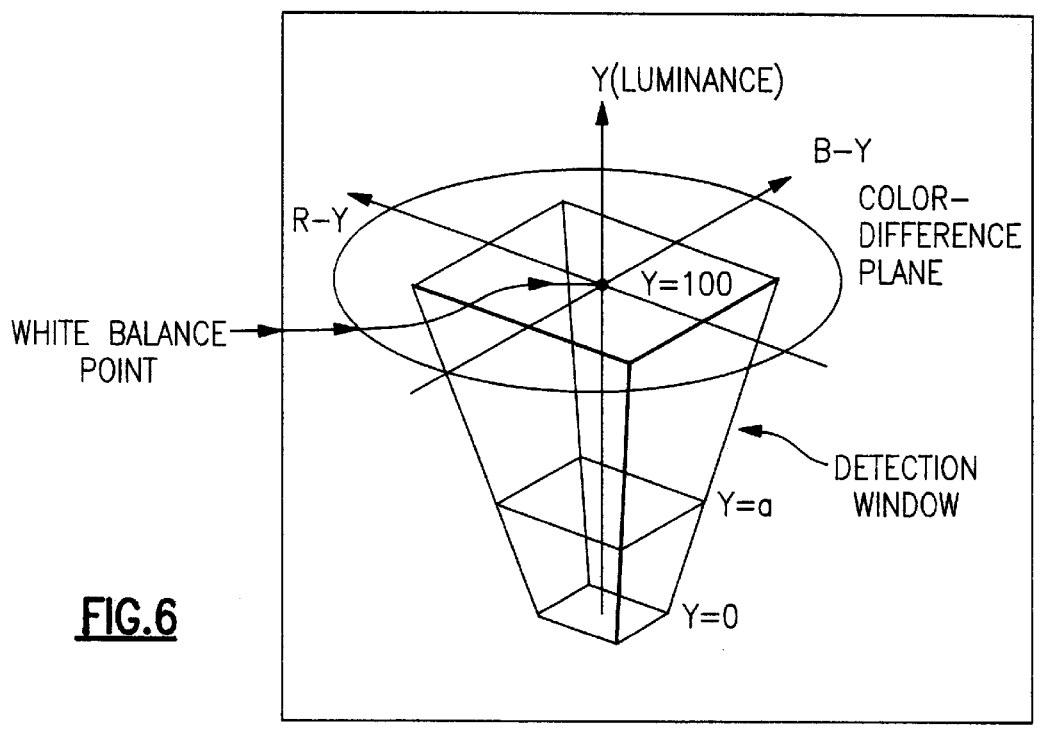

WHITE DETECTION ALGORITHM
CONCEPTUAL DIAGRAM

FIG.6

RGB MATRIX EXAMPLE—COMPLEMENTARY COLOR CCD $$\begin{bmatrix} R \\ G \\ B \end{bmatrix} = \begin{bmatrix} K_{G_{b.r}} & K_{W_{r.r}} & K_{W_{b.r}} & K_{G_{r.r}} \\ K_{G_{b.g}} & K_{W_{r.g}} & K_{W_{b.g}} & K_{G_{r.g}} \\ K_{G_{b.b}} & K_{W_{r.b}} & K_{W_{b.b}} & K_{G_{r.b}} \end{bmatrix} \begin{bmatrix} G_b \\ W_r \\ W_b \\ G_r \end{bmatrix}$$

—WHERE—

$G_b$ = GREEN + CYAN
$W_r$ = MAGENTA + YELLOW
$W_b$ = MAGENTA + CYAN
$G_r$ = GREEN + YELLOW

FIG.7

APPARATUS AND METHOD FOR VIDEO COLPOSCOPE WITH ELECTRONIC GREEN FILTER

FIELD OF TECHNOLOGY

This invention relates generally to video colposcopes, and specifically to video colposcopes using color filtering to enhance vascular discrimination.

BACKGROUND AND SUMMARY

When using a video colposcope for cervical or other examination, the user at times needs to view the subject area via the equivalent of a green filter to enhance vascular discrimination. In prior art embodiments, this is accomplished either by placing a conventional green filter between the subject area and the optics of the colposcope, or by illuminating the subject area with a green light source. The conventional green filter removes much of the red portion of the light. The conventional filters add cost, mechanical complexity, and reduce the total light energy available, which can degrade the quality of the final image. Positioning a separate light to illuminate the entire area with a green light source is inconvenient, adds cost, and can interfere with use of the colposcope.

While considering alternative ways to provide effective green-filter imaging of the cervix without the disadvantages of illumination-path or optical-path light filtering, the idea arose of using electronic modification of color in the video images produced by the colposcope to electronically reproduce the effect of an optical green filter.

Electronic modification of color in video images is well known, but has not been applied previously to colposcopy. The present invention effects a novel method and apparatus for using electronic modification of color to remove appropriate colors for the image so as to emulate the effect of placing an optical filter in the illumination or optics path of a video colposcope.

It is desired to provide a video colposcope that can be used to electronically produce images on a monitor that appear similar to those from conventional optical colposcopes that use an optical green filter.

It is also desirable to provide switch activation for the green filter effect in a colposcope to replace the mechanical knob or slide activation system used in conventional optical systems.

It would also be desirable to provide a green filter in a colposcope that eliminates the need for cleaning an optical filter or for a special green lighting apparatus.

Further, it would be desirable to provide an optimal green filter effect for a colposcope that is insensitive to the color of the available lighting.

Additionally, it would be desirable to provide a variable or otherwise selectable green filter effect in a colposcope.

Accordingly, the apparatus of the present invention comprises a video colposcope with an electronic color filter that can be switched on and off by a user, including storage means for storing reference data defining reference filter color balance levels, a video camera for obtaining an electronic image of a subject object, color balancing circuitry for modifying color saturation, hue, and intensity levels of the subject electronic image according to the reference filter color balance levels to produce a modified electronic image corresponding to the subject electronic image, and output means for outputting the modified electronic image to a display means in real time as the corresponding subject electronic image is obtained by the video camera.

In the method of the present invention, data defining reference filter circuitry or algorithms for color balance levels are stored in a storage means. A video camera obtains a subject electronic image of a subject object, and, using either color balancing analog circuitry or algorithm driven digital signal processing circuitry, color saturation, hue, and intensity levels of the subject electronic image are modified. This modification occurs according to the analog reference filter color balance levels or to the digital signal processing algorithm as stored in the storage means, thus producing a modified electronic image corresponding to the subject electronic image. The modified electronic image is outputted to a display means in real time as the corresponding subject electronic image is obtained by the video camera.

One embodiment of the invention for a video colposcope used as a diagnostic instrument comprises a video camera module combined with a light source and application-specific lenses. The video camera block is implemented with analog or digital signal processing technology. In digital signal processing technology the video image is represented as a pattern of digital bits (data) rather than as a collection of analog signals employed by a traditional video camera. Since the image exists as a numerical representation (data), processing can be done on the data that represents the signal (i.e., an image), rather than on the analog signal itself. With digital signal processing, functions such as equalization and filtering are realized by performing mathematical operations on the image data, rather than by using discrete electronic circuits.

By implementing the filter function as an algorithm to be performed on the data representing the image, rather than as a physical implementation, the green filter effect is achieved by processing the data set that comprises the image with an algorithm that produces the desired image information. Since the algorithm runs on the digital signal processing circuitry contained within the camera, there is no incremental cost except for the switch to turn the filter function off and on. The digital signal processing implementation has the additional potential for variable filter characteristics, with only an algortihm (or filter coefficient) change. The digital signal processing filter algorithm can also include a provision to "white balance" the resulting green-filtered image—essentially modifying the ratio of the remaining colors to approximate their prominance (or weight) if the camera were focused on a white scene. This provides a more pleasing representation to the human eye, while maintaining the advantages of the green-filtered image.

A user control means can be used to turn the filter function on and off. The user control means can be a simple switch or button, or any other method of allowing the user to turn the filter function on and off.

The invention can be made potentially less costly than conventional systems by use of inexpensive IC electronics and switches. Other advantages include switch activation (as opposed to a mechanical knob or slide used in conventional optical systems), selectable emulation of green filter characteristics (as opposed to using available optical green filter characteristics only), and the potential for variable filter characteristics, selectable by the user during use.

The invention involves replacing the conventional green filter of an optical colposcope with electronic reduction of the amplitude of at least one color in the video signal. For vascular discrimination using a colposcope, an optical green filter is emulated by decreasing the red portion of a video signal (not all the red is removed because a typical optical green filter passes some red light). Because the reduction is accomplished electronically (e.g., by analog means or by digital signal processing), the amount of this red reduction can be varied so as to optimize the characteristics of the electronic filter for vascular discrimination. Any changes needed in the characteristics of the filter can be easily made in the factory, or even by the user of the colposcope.

Emulation of some green filters can also require that the blue content of the signal be reduced. Again, since this reduction is made electronically, it can be implemented along with the red signal reduction to allow easy change in the factory or by the user.

BRIEF DESCRIPTION OF THE DRAWING

For a fuller understanding of the nature and objects of the invention, reference should be made to the following detailed description of some of the possible embodiments for practicing the invention, read in connection with the accompanying drawing, in which:

FIG. 3 is a cut away side view of an embodiment of the colposcope according to the invention;

FIG. 4 is a rear view cross-sectional view of the embodiment of FIG. 3;

FIG. 5 is a top view of the embodiment of FIG. 3;

FIG. 6 is a conceptual diagram of a white balance detection algorithm

FIG. 7 is an example of an RGB matrix for a complementary color CCD;

DETAILED DESCRIPTION

Figure 8:
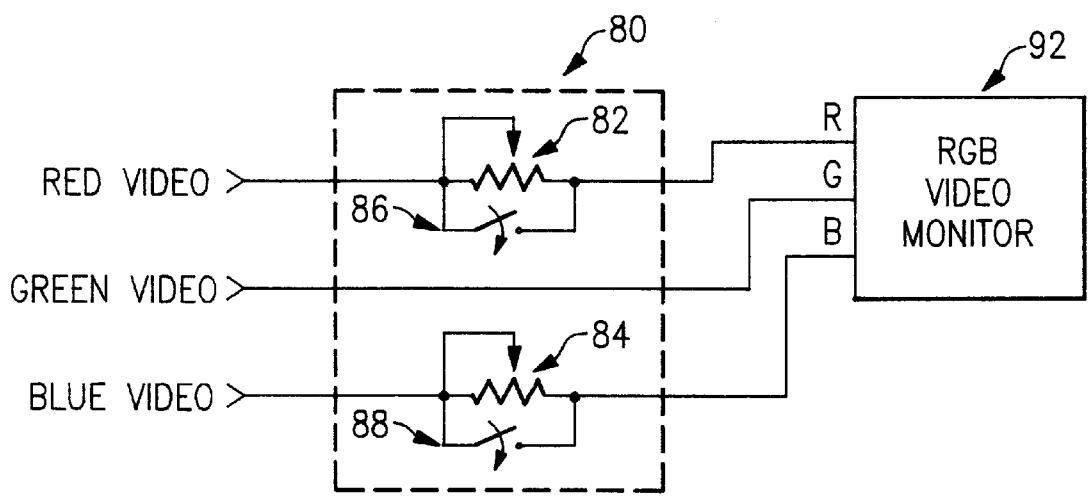
FIG. 8 is a schematic of a simple analog electronic filter.
Figure 9:
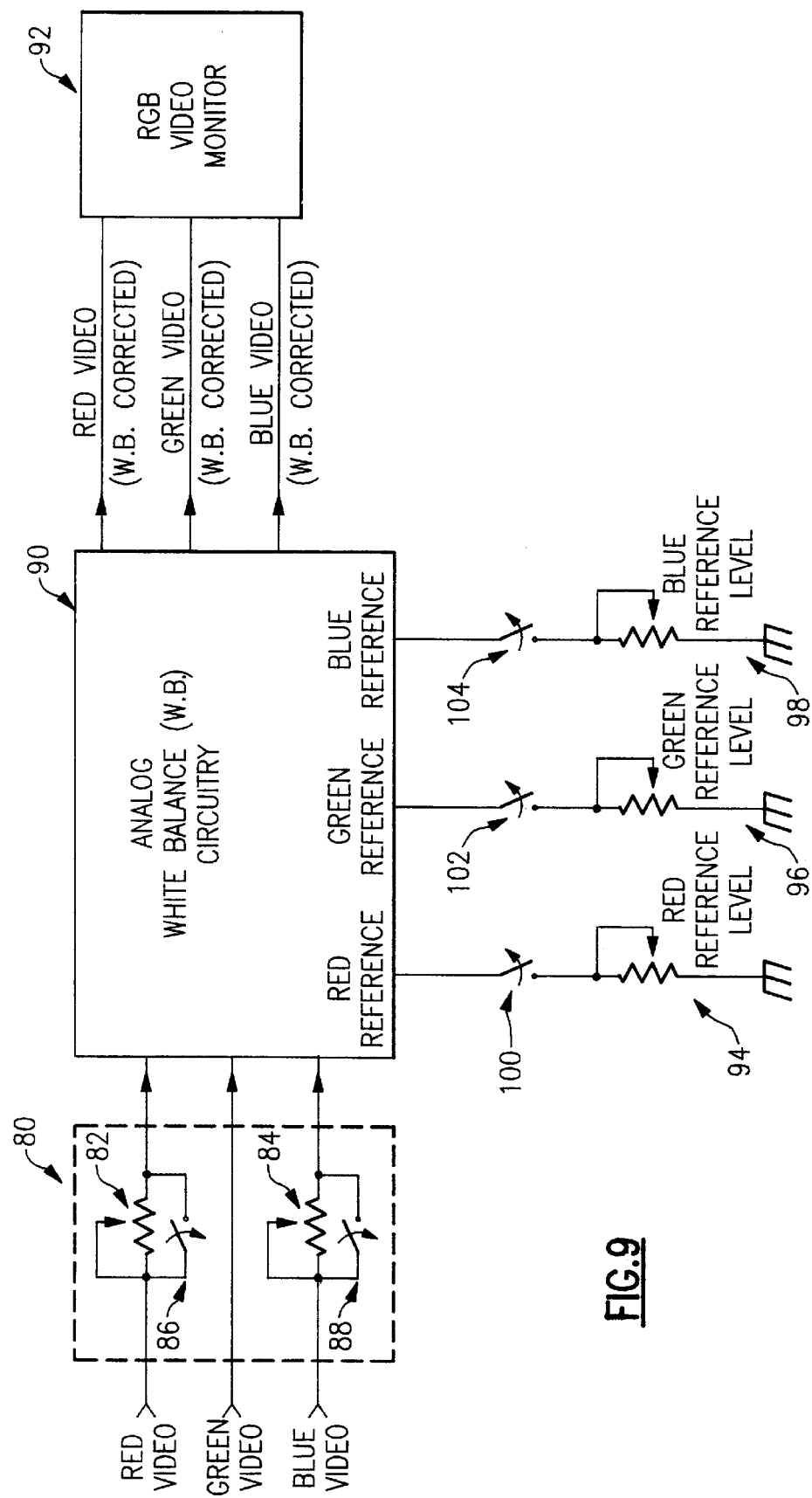
FIG. 9 is a schematic of a simple analog electronic filter with analog color balancing circuitry.

A simple analog electronic filter 80 can be accomplished by placement of a resistor in the red and in the blue lines of an RGB connection to a video monitor, as illustrated in FIG. 8. Increasing the resistance 82 in the red line will reduce the red content of the video signal to any desired extent. Increasing the resistance 84 in the blue line will reduce the blue content similarly. As a result, appropriate selection of the red and blue line resistors will allow the characteristics of any optical green filter to be matched closely. Closing of switches 86, 88 restores normal color operation. For Y-C and composite signals, more complex electronic embodiments than the above must be used. For digital signal processing systems, reduction of the red and blue colors can be accomplished via software, although, with current technology, this must typically be realized through appropriate treatment of the commonly-used complementary colors in CCD imagers. For primary color CCD imagers, only a software change is needed to accomplish the same red and blue color reduction. Also, it can be desirable to modify the color vectors that result from the red and/or blue reduction for achieving a simulated white balance. For example, an analog embodiment to achieve a simulated white color balance is shown in FIG. 9. Analog white balance circuitry 90 is placed between the simple analog electronic filter 80, and the RGB monitor 92. This analog white balance circuitry is well-known prior art that performs the same basic function as DSP processor described below, but in analog fashion. The reference levels for red, green, and blue are modified from those for normal operation by variable resistors 94, 96, and 98. Opening the switches 100, 102 and 104 together with closing switches 86 and 88 restores normal operation.

An embodiment of the invention incorporated into a colposcope with electronic green filter is now described with reference to FIG. 1. In this embodiment, the colposcope has two basic modes of operation: "normal" and "green filter." In the normal mode, a zoom lens 11 focuses an image onto the surface of a CCD imager sensor 13. The sensor converts the image to an analog electrical signal, which is amplified and sampled in a sample-and-hold means 15, and digitized by an analog-to-digital converter 17. The digital video is then routed to the digital signal processing processor (DSP) 18. The DSP 18 first separates the image data into luminance (black and white) and chrominance (color) components in a separator 19. The luminance signal then passes to a luminance processor 21 which processes the image for proper exposure, gamma correction, edge enhancement, and other customer-preference parameters as desired. The chrominance signal passes to the chrominance processor 23, which provides the proper ratio and amplitude of the three color primaries (red, green, blue). The color primaries are processed as vector quantities, with the length of the vector representing color saturation and the angle of the vector representing hue (i.e., pure green, greenish-red, greenish-blue, etc.). The color vectors are processed relative to each other, so their resultant combination represents the color of the captured scene. For instance, when the colposcope camera is focused on a white object, the color vectors should sum to produce a white scene on the monitor. This process is referred to as "white balance". The digital signal processing circuit chrominance processor 23 and white balance processor 25 achieve white balance by comparing and adjusting the incoming color information with an established set of "white" balance reference data 27.

The white balance reference data 27 are provided to the DSP 18 by the camera control micro computer 29. The camera control micro computer 29 can be set to provide either a fixed set of white balance data (from nonvolatile memory), or it can analyze the incoming illuminance and chrominance information and derive a set of data appropriate to the image being currently processed. In either case, the camera control micro computer 29 sends the appropriate data to the white balance processor 25 and white balance reference data 27 of the DSP 18.

After the chrominance and luminance processing are completed, digital-to-analog converters 31 convert the image back to the analog domain and via buffers 33 for display on a monitor (not shown). Although separate luminance Y and chrominance C signals are indicated, these signals can be combined via well known methods into a single composite video signal.

A system micro controller 35 provides an interface between the user and the camera. Zoom and focus commands are entered on at least one keypad 37 which is scanned by the system micro controller 35. The colposcope can have more than one keypad; for example it can have two keypads by which the user controls the camera, with the second keypad 39 being simultaneously scanned by the micro controller 35. The micro controller 35, in turn, signals the camera control micro computer 29 to execute algorithms for zoom and/or focus.

Figure 2:
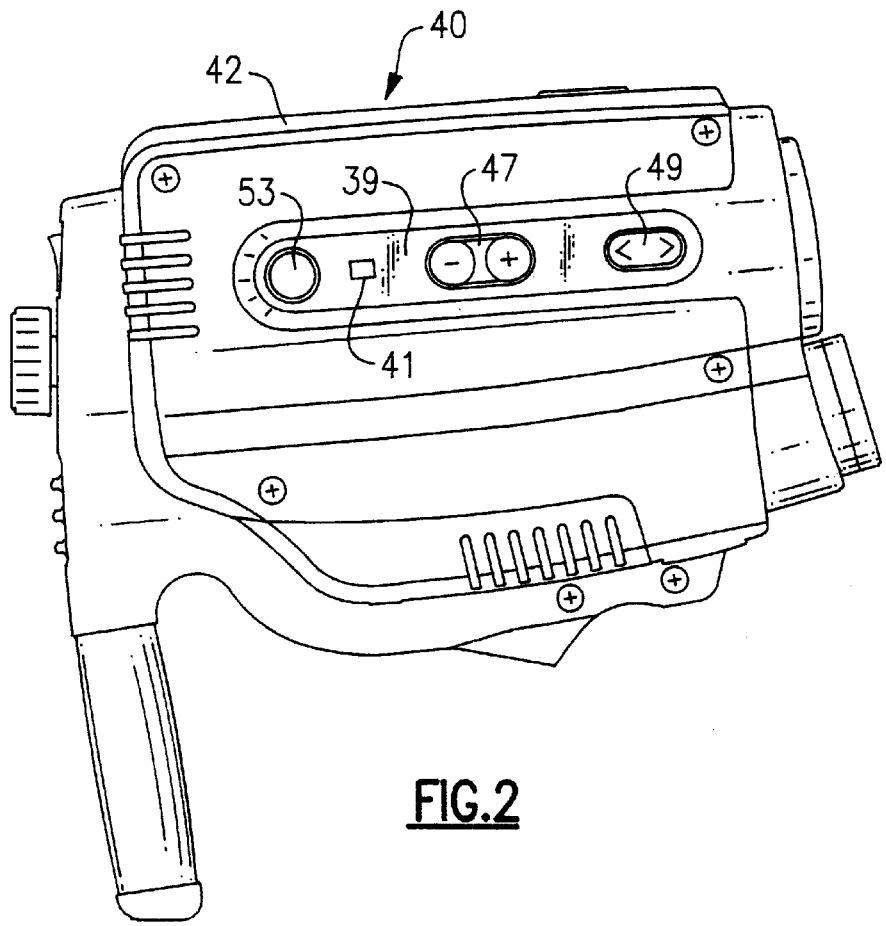
FIG. 2 is an external view of an embodiment of a colposcope with electronic green filter according to the invention.

Green filter mode may be initiated by activating a "green filter" key or button 53 (FIG. 2) on either key pad 37, 39. The system micro controller 35 then transfers modified algorithm and coefficient information to the camera control micro computer 29, which in turn relays the information to the chrominance processor 23 and white balance processor 25 sections of the DSP 18. The modified color processing algorithm modifies the color vectors to enhance the green response and suppress the red response. The white balance algorithm and data set are modified to adjust the green and blue vectors to achieve the best possible balance in the absence of red. The characteristics of the electronic green filter (such as the amount of red reduction and the subsequent balance of the resultant color vectors) may be varied through the "download" of various algorithm and coefficient data sets from the system micro controller 35.

An example of this process can be illustrated by referring to FIG. 7. Upon initiation of the green filter mode, system microcontroller 35 requests a copy of the RGB matrix from camera control microcomputer 29. Red response is decreased by reducing the red matrix coefficients $kG_{b,r}$, $kW_{r,r}$, $kW_{b,r}$ and $kG_{r,r}$. Similarly, green and blue responses may be modified through their respective coefficients. The system microcontroller 35 contains an algorithm which computes the values of the modified coefficients for the desired green filter response and then transfers the modified RGB matrix to the camera via the camera control microcomputer 29. Next, the system microcontroller 35 requests a copy of the white balance data from camera control microcomputer 29. These data can be represented as a three-dimensional control space, such as shown in FIG. 6. The white balance point (the intersection of the R-Y and B-Y vectors) is modified by introducing offsets (either positive or negative) along the R-Y and B-Y axes. The detection window (the range of values over which a satisfactory white balance can be achieved) is also moved, to ensure that the new simulated white balance point is centered in the detection window. The size of the detection window is changed as a function of luminance (Y) as shown in FIG. 6, with Y=100 representing a fully illuminated scene and Y=0 representing a black scene. Y=a represents a "typical" scene. The data that represent the new simulated white balance control space are calculated by the system microcontroller 35 and transferred to the camera via the camera control microcomputer 29. The green filter becomes operational after the receipt of the modified data.

The system micro controller signals the operation of the green filter by lighting a green filter status light emitting diode (LED) 41. If the user deactivates the green filter, the system micro controller 35 restores the original algorithms and data set (saved from the normal mode) through the camera control micro computer 29. The green filter status LED 41 is then extinguished and "normal" operation resumes.

Figure 1:
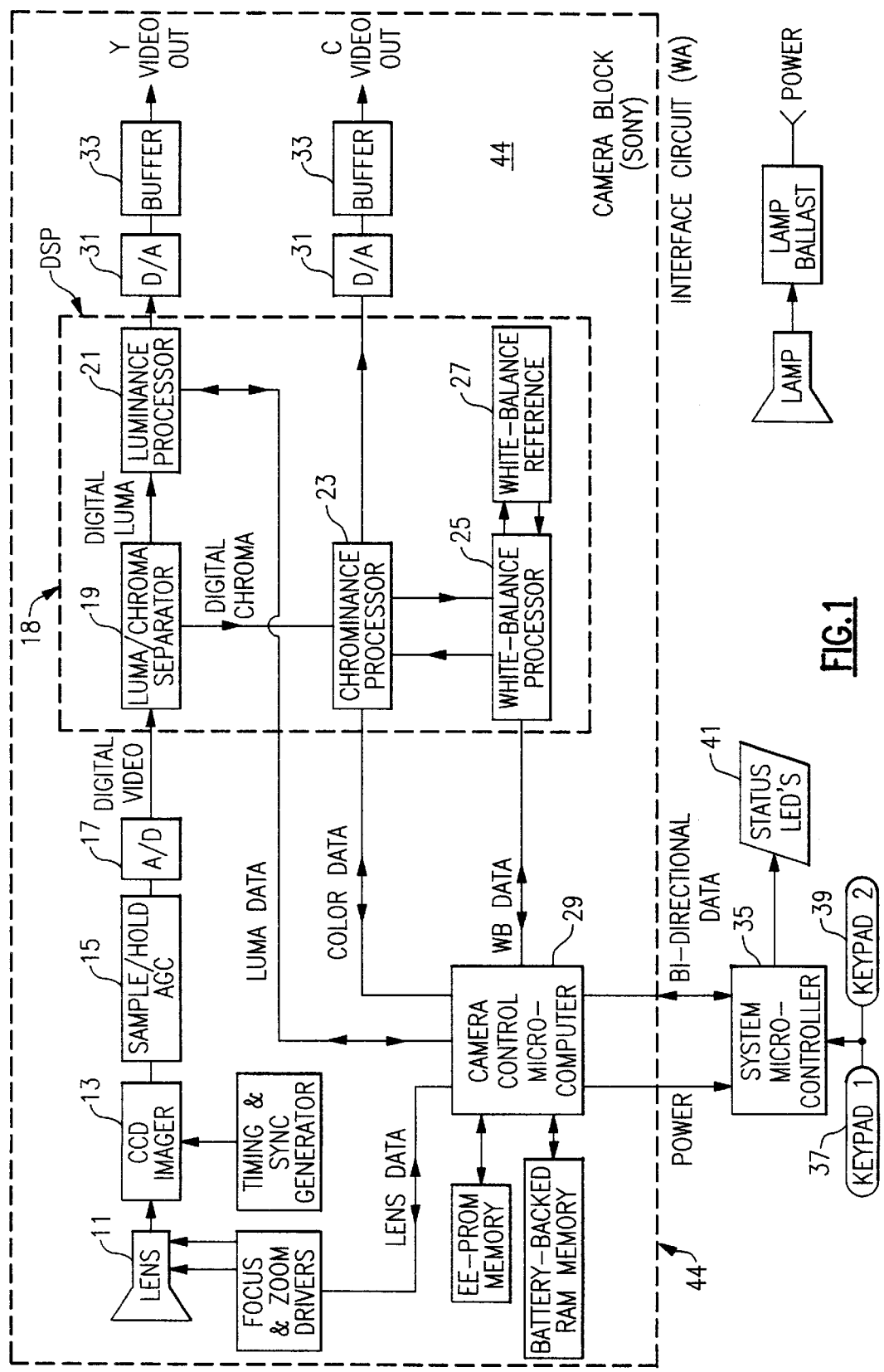
FIG. 1 is a block diagram of a colposcope with an embodiment of a digital signal processing electronic green filter according to the invention.

One embodiment of the invention incorporates a SONY model EVI-330 camera, which incorporates all the components shown in the video camera block 44 of FIG. 1.

An embodiment of a video colposcope according to the invention is now described with reference to FIGS. 2–5. A self-contained colposcope 40 is fully contained within a housing 42, which can be fabricated of plastic by injection molding, or any suitable means. The housing contains a window 45 for egress therethrough of an illuminating light beam that is produced by an internal light source 64 and that passes through a light collimator 67 to light a target (not shown). The light source includes a low power halide and discharge lamp assembly including a low power arc lamp having a power consumption of approximately 21 watts, and a reflector 65. The lamp assembly is a tightly focused reflectorized design for producing a small spot of light at the specified focal plane. The discharge lamp described in Graham et al., U.S. Pat. No. 5,083,059 of common assignee herewith, and incorporated herein by reference, is a suitable lamp. Most preferably Welch Allyn HI-LUXTM reflectorized lamp assemblies, such as the 21 watt model M21E001 are used. Due to the low power requirement of the lamp, it is desirable to dispose a miniature ballast 66 inside the housing 42. The ballast 66 is preferably of the type disclosed in U.S. Pat. No. 5,291,100 to Wood, which is incorporated herein by reference. This ballast is adapted to control the duty cycle of low wattage, high efficacy metal halide discharge lamps, and includes a power output sensing and emergency shutdown control circuit. It also has an circuit that provides constant output power that compensates for aging of the lamp. This ballast is available as model number B21N001 from Welch Allyn, Skaneateles Falls, N.Y., and has dimensions of 2×2.275×0.898 inches.

Light returning from the target reaches an internally located imaging camera 46 via receive optics 51. The receive optics 51 preferably comprise a lens that is optimized for focusing on a target approximately 12 inches distant. These optics, together with those in the camera, permit the target to be viewed with variable magnification. The image formed by the receive optics and camera optics is projected onto the optically active surface of a conventional imaging camera 46, which can be a SONY model EVI-330. The self-contained colposcope 40 is connected to a power source and a suitable display monitor (not shown). The user aims the colposcope at the target to be examined, and adjusts the optics in the camera for proper magnification and focus using the zoom control 47 and focus control 49.

The user depresses a key or button 53 on either key pad 37, 39 to initiate or terminate green filter mode. The "green filter" button 53 causes the system micro controller 35 to control the camera control micro computer 29 to execute the electronic green filter function accordingly, as described above.

While the present invention has been particularly shown and described with reference to embodiments described in the detailed description and illustrated in the drawing, it will be understood by one skilled in the art that various changes in detail may be effected therein without departing from the spirit and scope of the invention as defined by the claims.

We claim:

1. A video colposcope with a digital electronic color filter, said colposcope comprising:

storage means for storing data defining a reference filter algorithm and color balance levels;

a video camera for obtaining a subject electronic image of a subject object;

color balancing digital processing circuitry for modifying color saturation, hue, and intensity levels of the subject electronic image according to the stored reference filter algorithm to produce a continuous real time modified electronic image corresponding to the subject electronic image; and output means for outputting said continuous real time modified electronic image to a display means in continuous real time as the corresponding subject electronic image is obtained by the video camera, wherein said color balancing digital processing circuitry includes means for producing said continuous real time modified electronic image that emulates a subject electronic image obtained through an optical green filter, said color balancing digital processing circuitry further including digital white balance circuitry means for continuously simulating in conjunction with said continuous real time modified electronic image, a continuous real time simulated white balanced electronic image in which a new white balance point is simulated in accordance with the continuous real time modified electronic image, and in which the new white balance point is centered on a detection window.

2. The colposcope with a digital electronic color filter as recited in claim 1, wherein said reference data and said color balancing digital signal processing circuitry and algorithms are such that said modified electronic image can be altered by the user through changing the parameters in the digital signal processing data and algorithms.

3. The colposcope with a digital electronic color filter as recited in claim 1, further comprising switching means for allowing a user to choose which of said subject electronic image and said continuous real time modified electronic image is outputted by said output means.

4. The colposcope with a digital electronic color filter as recited in claim 1, further comprising zoom means for one of optically and electronically producing an enlarged one of said subject electronic image and said continuous real time modified electronic image as outputted by said output means.

5. The colposcope with a digital electronic color filter as recited in claim 1, further comprising focus means for focussing said video camera depending on the distance from said video camera to said subject object.

6. A video colposcope as recited in claim 1, wherein the size of said detection window is changed based on the amount of luminance in a scene being viewed with the video camera.

7. A method for processing a video signal through an electronic color filter in a video colposcope, said method comprising the steps of:

storing in a storage means reference data defining a reference filter algorithm and color balance levels;

obtaining a subject electronic image of a subject object from a video camera;

using algorithm-driven digital processing circuitry for modifying color saturation, hue, and intensity levels of the subject electronic image according to the filter algorithm and color balance levels to produce a continuous real time modified electronic image that corresponds to the subject electronic image and that emulates an image produced by an optical green filter;

using said continuous real time modified electronic image to calculate a continuous real time simulated white balanced modified electronic image in which a new white balance point is simulated in accordance with the modified image and in which the new white balance point is centered on a detection window; and outputting said continuous simulated white balanced modified electronic image to display means in continuous real time as the corresponding subject electronic image is obtained by the video camera.

8. A method as recited in claim 7, including the step of changing the size of the detection window based on the amount of luminance in the scene being viewed.

* * * * *